United States Patent
Mayr et al.

(10) Patent No.: US 8,789,424 B2
(45) Date of Patent: Jul. 29, 2014

(54) METHOD FOR MANUFACTURING MEASURING TRANSDUCERS

(75) Inventors: Andreas Mayr, Lorrach (DE); Michael Philipps, Lorrach (DE); Matthias Altendorf, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 424 days.

(21) Appl. No.: 13/139,779

(22) PCT Filed: Nov. 20, 2009

(86) PCT No.: PCT/EP2009/065528
§ 371 (c)(1),
(2), (4) Date: Jun. 15, 2011

(87) PCT Pub. No.: WO2010/069707
PCT Pub. Date: Jun. 24, 2010

(65) Prior Publication Data
US 2011/0247424 A1    Oct. 13, 2011

(30) Foreign Application Priority Data
Dec. 17, 2008  (DE) .......................... 10 2008 054 829

(51) Int. Cl.
*G01L 9/10*  (2006.01)
*G01L 9/14*  (2006.01)

(52) U.S. Cl.
USPC ............................................. 73/722; 73/146

(58) Field of Classification Search
None
See application file for complete search history.

(56) References Cited

U.S. PATENT DOCUMENTS

| 4,025,912 A | 5/1977 | Rice |
| 6,720,866 B1* | 4/2004 | Sorrells et al. ............... 340/10.4 |
| 6,917,291 B2* | 7/2005 | Allen .......................... 340/572.1 |

(Continued)

FOREIGN PATENT DOCUMENTS

| DE | 10 2006 032 905 A1 | 10/2007 |
| DE | 10 2006 024 743 A1 | 12/2007 |
| DE | 10 2006 045 952 A1 | 4/2008 |
| DE | 10 2006 054 421 A1 | 5/2008 |

OTHER PUBLICATIONS

International Search Report.
German Search Report.

(Continued)

*Primary Examiner* — Lisa Caputo
*Assistant Examiner* — Jermaine Jenkins
(74) *Attorney, Agent, or Firm* — Bacon & Thomas, PLLC (57) ABSTRACT

A method for manufacturing measuring transducers, especially pressure or pressure difference measuring transducers, in which a high degree of quality, safety and accuracy of measurement is achievable with little logistical and manufacturing effort. The measuring transducer has a memory readable and writable via an associated RFID interface, and at least one sensor for registering a physical, measured variable and for transducing such into an electrical variable, wherein the sensor is equipped with sensor electronics, which serves to condition the electrical variable into an electrical measurement signal dependent on the measured variable, and which is equipped with an RFID transponder, via which the sensor is supplied with energy, and via which measurement signals can be read out wirelessly. The measuring transducers and/or their sensors are subjected to at least one calibration and/or test procedure, in which the sensors are exclusively supplied with energy via their RFID transponders, and their measurement signals are read out via their RFID transponders, and measuring transducer specific and/or sensor specific data derived during the calibration and/or test procedure are stored in the memory via the RFID interface.

13 Claims, 2 Drawing Sheets

(56) References Cited

U.S. PATENT DOCUMENTS

| | | | |
|---|---|---|---|
| 6,925,287 B2 * | 8/2005 | Davie et al. | 455/41.1 |
| 6,927,687 B2 * | 8/2005 | Carrender | 340/539.26 |
| 7,221,270 B2 * | 5/2007 | Chen et al. | 340/539.13 |
| 7,636,031 B2 * | 12/2009 | Mirmobin et al. | 340/10.1 |
| 7,880,634 B2 * | 2/2011 | Fuller et al. | 340/691.6 |
| 7,944,338 B2 * | 5/2011 | Nemoto et al. | 340/10.34 |
| 8,111,143 B2 * | 2/2012 | Tong et al. | 340/10.51 |
| 8,491,159 B2 * | 7/2013 | Recker et al. | 362/276 |
| 2007/0164859 A1 | 7/2007 | Cobianu | |
| 2007/0229229 A1 | 10/2007 | Nelson | |
| 2007/0252691 A1 | 11/2007 | Mirmobin | |

OTHER PUBLICATIONS

English translation of the IPR.

* cited by examiner

METHOD FOR MANUFACTURING MEASURING TRANSDUCERS

TECHNICAL FIELD

The invention relates to a method for manufacturing measuring transducers, especially pressure, or pressure difference, measuring transducers.

BACKGROUND DISCUSSION

Measuring transducers are applied today in a wide variety of applications in industrial measurements technology. Pressure measuring transducers are produced and sold by Endress+Hauser under the mark CERABAR and pressure difference transducers under the mark DELTABAR.

Pressure and pressure difference transducers contain, respectively, pressure and pressure difference sensors for registering the pressure to be measured, or the pressure difference to be measured, and for transducing the same into an electrical variable. The sensors are usually equipped with sensor electronics, which conditions the electrical variable into a pressure dependent, electrical measurement signal. Measuring transducers are usually applied in measuring devices, which have measuring device electronics, to which the measurement signal is fed via an electrical connection from the measuring transducer to the measuring device electronics. However, pressure measuring devices are also known, in which energy supply of the pressure sensor and transmission of the measurement signal occur between measuring device electronics and pressure sensor electronics via a wireless connection. An example of an inductive coupling between a pressure sensor and measuring device electronics is described in DE 40 33 053 A1. The measuring device electronics determines the pressure to be measured based on the measurement signal and makes the measurement result available to a display, an additional application and/or for additional processing.

Modern electrical measuring devices and therewith also their measuring transducers must satisfy ever higher requirements for quality, safety and accuracy of measurement.

For this, most manufacturers have an active and comprehensive quality management for the manufacturing process. For quality assurance, especially, strict constraints are placed on the manufacturing processes, which require, especially, regular checking and exact documenting of the individual manufacturing steps. The identifiability of the measuring transducers and/or sensors plays an important role in this context. The identification of measuring transducers and/or sensors usually occurs based on labels applied thereon, via which the measuring transducers or their sensors are associated with serial numbers. The documenting of the manufacturing process is stored under the serial number, based on which, for example, manufacturing data, such as e.g. production data, batch numbers, etc., can then be ascertained.

However, labels or other forms of identifications or markings require space. A label typically has a size of 10 mm×10 mm. However, as miniaturization of electronic devices progresses, this space is not always present. Moreover, the labels of label-equipped components can become hidden during installation, so that then they are no longer readable.

The measuring transducer and/or their sensors are always subjected to ever more comprehensive calibration and/or test procedures, in order to fulfill the high requirements for safety and accuracy of measurement. These methods are now an inherent component of the manufacturing and are usually executed in corresponding production lineS, in which the measuring transducerS pass through correspondingly embodied production stations.

This means, however, a very high manufacturing effort, since each measuring transducer, for each of these procedures to which it must be subjected, must be mounted in the corresponding production station and, above all, in each case, must again be electrically connected. The electrical connection is required during this process to supply energy for the measuring transducer, especially its sensors, in order to be able to obtain their measurement signals.

In serial production, these procedures present a logistical problem to ensure that the results of the individual calibration, and/or test, methods are really associated with the measuring transducer from which they were derived.

A further problem is posed by those calibration and/or test procedures, in the case of which measuring transducer and/or sensor specific data must be recorded to be available for the faultless functioning of the measuring transducer and/or for achieving the desired accuracy of measurement in the measuring transducer and/or in a measuring device equipped with the measuring transducer. These include especially data derived from calibration procedures such as, e.g. characterizing parameters and/or curves, which are subsequently required for conditioning the measurement signal, for ascertaining pressure or pressure difference and/or for compensating measurement errors.

For example, sensor specific characteristic curves, which reflect the sensor specific response of the respective sensor as a function of the pressure, or pressure difference, acting thereon are recorded. Additionally, as a rule, a temperature dependence of the response is determined, which is subsequently used for the compensation of temperature dependent measurement errors of the pressure or pressure difference sensors.

There are pressure, or pressure difference, measuring transducers that include a pressure transfer means filled with a pressure transmitting liquid. The pressure transfer means serve to transfer to the sensor a pressure to be measured, for example, a pressure acting externally on an isolating diaphragm of the pressure transfer means. When pressure transfer means are used, then their response in terms of a transfer characteristic and the temperature dependence thereof must be taken into consideration. The temperature dependence can be derived, for example, using temperature sensors arranged in the pressure transfer means, as described, for example, in EP 0 764 839. In order to supply the temperature sensors with energy and to record their measurement signals, the temperature sensors arranged in the pressure transfer means must be electrically connected for these calibration and/or test procedures.

The data ascertained in the test and/or calibration procedures must, in each case, be correctly associated with the respective measuring transducer and/or sensor, buffered in the production station and forwarded to their ultimate destination. In such a case, the ultimate destination can also lie outside the measuring transducer. This is e.g. the case, when these data are required by the measuring device electronics of the measuring device, in which the measuring transducer is applied at a later point in time.

In DE 10 2006 024 743 A1, a measurement transmitter is described, which has a memory, in which calibration data and application or configuration data are stored, which in the case of a defective measurement transmitter can be read out via an external auxiliary device via an autarkic RFID interface and transmitted into the corresponding memory of a replacement device.

SUMMARY OF THE INVENTION

It is an object of the invention to provide a manufacturing process for measuring transducers and measuring transducers manufactured with this manufacturing process, with which a high level of quality, safety and accuracy of measurement is achievable with small logistical and manufacturing effort.

To this end, the invention resides in a method for manufacturing measuring transducers, especially pressure, or pressure difference, measuring transducers, with:

a memory readable and writable via an associated RFID interface; and at least one sensor for registering a physical, measured variable and for transducing such into an electrical variable, which is equipped with sensor electronics,
which serves to convert the electrical variable into an electrical measurement signal dependent on the measured variable, and
which is equipped with an RFID transponder,
via which supply of energy to the sensor occurs, and
via which measurement signals can be read out wirelessly, wherein the measuring transducer and/or their sensors at subjected to at least one calibration and/or test procedure, wherein sensors are supplied with energy exclusively via their RFID transponders, and their measurement signals are read out via their RFID transponders, and measurement transducer specific and/or sensor specific data are derived based on the one or more calibration and/or test procedures and are stored in the memory via the RFID interface.

In a further development of the method of the invention, a calibration procedure is executed, in which a response of the sensors and/or the measuring transducers is ascertained as a function of the physical, measured variable and/or a temperature dependence of such response, wherein data reflecting the response, especially characterizing parameters or characteristic curves, are derived and stored in the memory.

In an additional further development, the invention resides in a method of the invention, wherein the measuring transducer is a pressure or pressure difference transducer, which has at least one pressure transfer means, at least one sensor is a temperature sensor arranged in the pressure transfer means, and a calibration procedure is executed, in which
a response of the pressure transfer means as a function of pressure acting thereon and temperature registered by the temperature sensors is ascertained,
data, especially characterizing parameters or characteristic curves, which reflect this response, are derived and
such data are stored in the memory via the RFID interface associated with the memory.

In additional further development, the invention includes a method of the invention, wherein a transponder identifier of each sensor is read out and associated with a serial number, and the measuring transducer and/or the respective sensor are contactlessly identified during the total following manufacturing process based on the transponder identifier and/or the serial number associated therewith and stored in the memory via the RFID interface.

In an additional further development, manufacturing data registered during manufacture, especially a date of manufacture, a batch number, data relevant to the quality of the manufacturing process and/or a serial number, are stored in the memory via the RFID interface associated with the memory.

In an additional further development, the invention resides in a method of the invention, wherein the measuring transducer passes in a production line sequentially through a plurality of production stations, in which, in each case, a portion of the manufacturing process is executed, the measuring transducer is identified at the production stations via the transponder identifiers of the sensors and/or data stored in the memory, which is read out in the respective production station via the RFID interface associated with the memory, and/or manufacturing relevant data from one production station is transmitted to a following production station by storing data in the memory at the one production station via a read write apparatus of such production station and the RFID interface associated with the memory and by reading the data out of the memory at the following production station via a read write apparatus of that production station and the RFID interface associated with the memory.

Additionally, the invention resides in a measuring transducer, especially a pressure or pressure difference transducer, comprising:

At least one sensor for registering a physical, measured variable and for transducing such into an electrical variable, wherein the sensor is equipped with a sensor electronics,
which serves to condition the electrical variable into an electrical measurement signal dependent on the measured variable, and
which is equipped with an RFID transponder,
via which the sensor is supplied with energy, and
via which the measurement signals can be read out wirelessly, and a memory readable and writable via an associated RFID interface,
wherein measuring transducer specific and/or sensor specific data derived from calibration and/or test procedures are stored in the memory via the RFID interface.

In a further development, the invention resides in a measuring transducer of the invention, wherein a sensor is a pressure or a pressure difference sensor, and the memory and the RFID interface associated therewith are components of the sensor electronics of such sensor, especially its RFID transponder.

In a further development of the last further development, the sensor electronics has access to data derived during the calibration and/or test procedures and stored in the memory, and uses at least one of these data for subsequent transducings of the physical, measured variable into the electrical measurement signal.

In a further development, the invention resides in a measuring transducer of the invention, wherein the measuring transducer is a pressure or pressure difference transducer equipped with at least one pressure transfer means, and the sensors include at least one temperature sensor, which is arranged in the pressure transfer means, and measuring transducer specific data derived from calibration and/or test procedures are stored in the memory via the RFID interface, wherein the data reflect response of the pressure transfer means as a function of pressure acting thereon and temperature dependence of this response.

Additionally, the invention resides in a measuring device comprising:
- A measuring transducer of the invention,
- a measuring device electronics, which has an RFID interface,
  - via which the measuring device electronics supplies the sensors with energy,
  - via which the measuring device electronics receives measurement signals of the sensors, and
  - via which the measuring device electronics has access to data stored in the memory.

Additionally, the invention resides in a measuring device of the invention comprising a pressure difference transducer of the invention, wherein the pressure difference transducer includes a pressure difference sensor having at least one pressure transfer means connected thereto, in which, in each case, a temperature sensor is arranged, wherein
- data recorded with the temperature sensors and the pressure difference sensor are stored in the memory, wherein the data reflect response of the pressure transfer means as a function its temperature, and
- the measuring device electronics has signal processing, which produces a pressure difference measurement signal compensated relative to temperatures reigning in the pressure transfer means, based on a pressure difference measurement signal of the pressure difference sensor, measurement signals of the temperature sensors and data stored in the memory.

In a further development of the last measuring device, such includes a monitoring unit, which monitors measurement signals of the temperature sensors and triggers an error report and/or an alarm in the case of loss of a measurement signal of a temperature sensor.

BRIEF DESCRIPTION OF THE DRAWINGS

The invention and further advantages will now be explained in greater detail based on the figures in the drawing, in which two examples of embodiments are presented; equal elements are provided in the figures with equal reference characters. The figures show as follows:

FIG. 3 is a production line; and

DETAILED DISCUSSION IN CONJUNCTION WITH THE DRAWINGS

Figure 1:
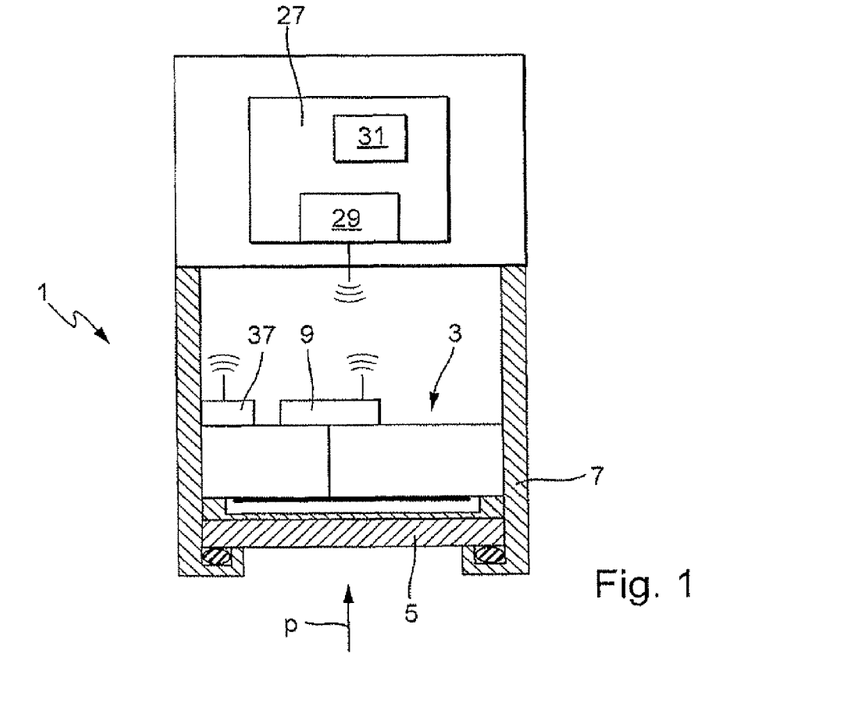
FIG. 1 is a schematic representation of a pressure measuring device with a pressure measuring transducer.

FIG. 1 shows a schematic representation of a measuring device with a measuring transducer 1 manufactured according to the invention. The illustrated example of an embodiment is a pressure measuring device with a pressure measuring transducer.

Measuring transducer 1 includes at least one sensor for registering a physical, measured variable and for transducing such into an electrical variable. In the illustrated example of an embodiment, this is a capacitive pressure sensor 3, which has a measuring membrane 5, to which an external pressure p to be measured is fed. This effects a pressure dependent deflection of the measuring membrane 5, which is converted to an electrical variable, here a capacitance, dependent on the acting pressure p, by an electromechanical transducer connected to the measuring membrane 5. The sensor 3 is illustrated in its end state installed in a measuring transducer housing 7.

Sensor 3 is equipped with a sensor electronics 9, which serves to condition the electrical variable to an electrical measurement signal dependent on the measured variable. For this, the sensor electronics 9, shown in detail in FIG. 2, includes a signal conditioning circuit 11, which is connected to the electromechanical transducer. Furthermore, the sensor electronics 9 is equipped with a Radio Frequency Identification Device transponder (RFID transponder) 13, via which the sensor 3 is supplied with energy, and via which the measurement signals generated by the signal conditioning circuit 11 can be read out wirelessly.

Figure 2:
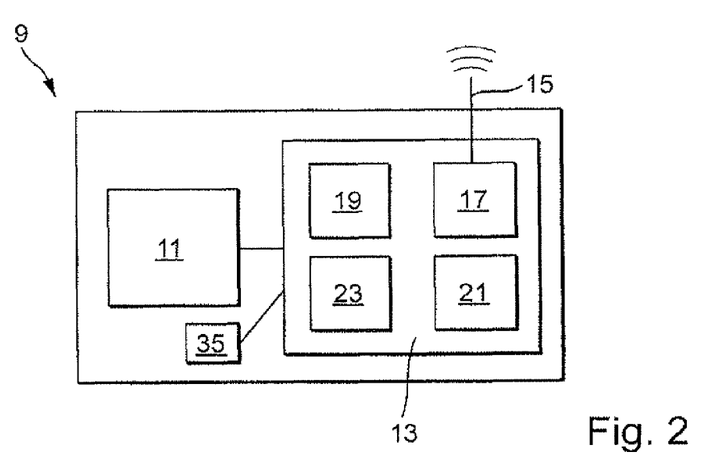
FIG. 2 is the sensor electronics of the pressure sensor of FIG. 1.

For this, RFID transponders 13 usually include an antenna 15, an analog circuit 17 for sending and receiving (transceiver), as well as a microchip equipped, digital circuit 19 and a memory 21, in which a unique transponder identifier is stored. Sensor electronics 9 is here preferably embodied as an Application Specific Integrated Circuit (ASIC) containing an integrated RFID transponder 13.

According to the invention, the measuring transducer 1 includes a memory 23, which is readable and writable via an RFID interface associated with the memory 23.

Memory 23 and the RFID interface associated therewith are preferably components of the sensor electronics 9, especially the RFID transponder 13. For this, an RFID transponder 13, in which the memory 23 is already integrated, is preferably applied. Information can be stored in this memory 23 over the total lifetime of the RFID transponder 13 and, at any time, be wirelessly queried and read out via a corresponding reading device. The RFID interface associated with the memory 23 includes the transceiver 17 and the antenna 15 of the RFID transponder 13 in the illustrated example of an embodiment.

According to the invention, the measuring transducer 1 is subjected to at least one calibration and/or test procedure, during which the sensor 3 is supplied with energy from the sensor electronics 9 exclusively via the RFID transponder 13, and the measurement signals of the sensor 3 generated during procedures are exclusively read out via its RFID transponder 13. On the basis of this calibration and/or test procedure, measuring transducer specific and/or sensor specific data are derived and are stored in the memory 23 via the RFID interface.

In the serial production of measuring transducers, manufacturing lines are regularly applied, which have a plurality of production stations, through which each measuring transducer 1 sequentially travels. A part of the manufacturing process is executed in each production station. In such a case, as far as such is possible, processes known as batch processes are applied, in which a plurality of measuring transducers 1 are subjected to the same portion of the manufacturing process in the respective production station at the same time. FIG. 3 shows a schematic representation of such a production line comprising the production stations A through D. Each of the production stations A through D has a read write apparatus 25, via which the RFID transponders 13 of the sensors 3, and through this, the sensors 3 as a whole, can be supplied with energy, via which the transponder identifiers and the data stored in the memories 23 can be read out, and via which data can be stored in the memories 23. Furthermore, in the production stations, in which the measurement signals of the sensors 3 are required during the portion of the manufacturing process to be performed there, these measurement signals are read out via these read write apparatuses 25. An electrical connection of the measuring transducer 1, especially of their sensors 3, is therefore no longer required at any time during course of the entire manufacturing process. This saves time and increases safety, since problems which can occur, for example, through aging contact connections of the production stations, defective contacts or servicing errors, are excluded.

Preferably, at an earliest possible point in time, especially directly after applying the sensor electronics 9 to the sensors 3, the transponder identifiers of the sensors 3 are read out and associated with a serial number. This happens in the first production station A in the illustrated example of an embodiment. The read out of the transponder identifiers occurs automatically via the read write apparatus 25. This represents at the same time a first test procedure, when those sensors 3, whose transponder identifiers cannot be read out are recognized as defective and are correspondingly separated out. The associated serial numbers are preferably directly stored in the memories 23 by the read write apparatus 25 via the RFID interfaces of the sensors 3. Then, each sensor 3, and therewith also the measuring transducer 1 later containing the sensor 3, is contactlessly identifiable at any time during the total following manufacturing process and thereafter, based on the transponder identifier and/or the associated serial number stored in the memory 23 via the RFID interface.

The storing of the serial number offers the advantage that the sensors 3 and/or the measuring transducer 1 must not be provided with a corresponding label or similar mark. The serial number is now capable of externally being read out contactlessly at any time, even after the installation of the completed measuring transducer 1 by the end customer. Such is naturally also true for other data stored in the memory 23.

As a further test procedure, a first measurement signal of the sensors 3 can be recorded via the read write apparatus 25 already in the first production station A, in order to assure the basic ability of the sensors 3 to function already at this location.

Preferably, the individual measuring transducers 1 are identified in the following production stations B, C, and D via the transponder identifiers of their sensor 3 and/or via data stored in their memories 23, which are read out contactlessly in the respective production station B, C, or D. This step can be executed automatically with the entry of the measuring transducer 1 into the particular production station A through D, and can especially be executed in parallel for a plurality of measuring transducers 1, introduced into the production station at the same time, mechanically secured on a carrier. This procedure offers a high level of safety, since interchanges or mix ups can then still be reliably excluded through the unique identification, if e.g., the carriers are interchanged or measuring transducers 1 on the supports are moved.

Additionally, the unique identification offers the advantage that it can be used for flow control within the total manufacturing process.

Preferably, the memories 23 are utilized supplementally to transmit manufacturing relevant data from a production station A, B or C to a following production station B, C or D. For this, these data are stored in the memories 23 at the respective production stations A, B or C via the respective read write apparatus 25 and are read out from the memories 23 at the following production station B, C or D via its read write device 25. Thereafter, transferred data, which later will no longer be required, naturally can be deleted from a memory 23. In this way of data transfer between the individual production stations A, B, C, D, the otherwise required central data management and the corresponding data transfer apparatuses can be completely, or at least partially, omitted.

Furthermore, for quality assurance, it can be checked and assured through this method in a simple manner whether a measuring transducer 1 has successfully traveled through all production stations A through D in the right sequence. This is accomplished, for example, by the feature that each production station A, B, C, D, at the end of its associated portion of the manufacturing process, documents the termination of its portion of the manufacturing process an, in given cases, provides an associated evaluation, by a corresponding entries in the memory 23. The Following production stations B, C, or D then check, based on these data, in each case, whether the measuring transducer 1 has successfully traveled through all preceding production stations A, B, and C. On the basis of the corresponding evaluation, it can supplementally be assured, for example, that a measuring transducer 1 is not mistakenly put back into the manufacturing process once it has been declared as scrap.

In the second production station B, the sensors 3 are subjected e.g. to a calibration procedure, in which response of the sensors 3 is determined as a function of pressure p acting thereon. From this, calibration data are derived for each sensor 3 and stored in its memory 23 as e.g., characterizing parameters and/or characteristic curves. In this case, an electrical connection is also not required. The sensors 3 must only be secured mechanically to the pressure supply lines suitable for the calibration procedure and be exposed to the environmental temperatures predetermined through the choice of calibration procedure. In such a case, it is automatically assured that the data are stored in correct association in the memories 23 of the respective sensors 3 via the unequivocal, completely automatic, contactless identification of the sensors 3.

Preferably, the measuring transducers 1 are embodied in such a manner that the sensor electronics 9 has access to the data stored in the memory 23. Therewith, the data derived during the calibration and/or test procedure and stored in the memory 23 are directly available to the sensor electronics 9. The sensor electronics 9 uses at least one of these data in the following transducings of measured pressures p into the electrical measurement signal. This is accomplished, for example, by the feature that the sensor electronics 9, especially its signal processing circuit 11, uses such data to linearize the measurement signal as a function of the pressure p to be measured.

Final assembly is carried out e.g. in production station C. In the illustrated example of an embodiment, the sensors 3 are inserted into their measuring transducer housings 7 at station C.

Finally the measuring transducer 1 is subjected, as indicated here by the production station D, to additional test procedures, in which functional ability, accuracy of measurement, impermeability of the housing, etc. are checked, for example, using targeted reviews, tests, measurements, etc.

Preferably, manufacturing data registered during manufacture, especially date of manufacture, batch number and/or data relevant for the quality of the manufacturing process, are supplementally stored in the memory 23. These data can then, at any time, be read out contactlessly via the RFID interface. Examples for this are the type numbers of the measuring transducer housing 7, as stored in the memory 23 at production station C, as well as test results, such as e.g. the result of the test of the impermeability of the housing, as stored in the memory 23 at production station D.

The measuring transducer manufactured according to the invention is preferably applied, as shown in FIG. 1, in a measuring device equipped with a measuring device electronics 27 having an RFID interface 29. RFID interface 29 preferably forms the only electrical connection for the measuring transducer 1. Via RFID interface 29, sensor 3 is supplied with energy from the measuring device electronics 27, the measuring device electronics 27 receives the measurement signals of the sensor 3, and measuring device electronics 27 has access to the data stored in memory 23.

An electrical connection between the measuring device electronics 27 and the sensor electronics 9 is not required. Since both the energy supply as well as the transmission of the data and measurement signals occurs wirelessly, the measuring device electronics 27 and measuring transducer 1 can also be applied spatially isolated from one another as separated modules, which also need not necessarily be mechanically connected to one another.

Here, the invention offers the advantage that all data required for interaction of measuring transducer 1 and measuring device electronics 27 can be stored in the memory 23 of measuring transducer 1 at the factory in the context of the manufacturing method. The measuring device electronics 27 identifies the measuring transducer 1 based on the data and can directly be taken into operation. In such case, all required data are available via the RFID interface 29. Data transfer from external media is not required. In this way, a modularity results, which subsequently enables replacement of a defective measuring device electronics 27 or measuring transducer 1, especially also by the end user. Additionally, the measuring device of the invention offers the advantage that, e.g. for initial startup, predetermined application specific data can be stored, both in a memory 31 of the measuring device electronics 27 as well as in the memory 23 of the measuring transducer 1 via the RFID interface 29. These data, in the case of replacement of the measuring device electronics 27 or the measuring transducer 1, must not be specified anew.

Naturally, the invention is also completely analogously applicable for pressure difference transducers and pressure difference measuring devices. In this case a pressure difference sensor 33 with a correspondingly built sensor electronics 9 is applied in place of the pressure sensor 3. This is shown in FIG. 4.

Naturally, the invention is analogously applicable or expandable for other sensors of the measuring transducers. These include sensors for registering secondary measured variables, such as e.g. temperature, in addition to the sensors 3 already described for registering the primary measured variable, here, pressure or pressure difference. Suitable in this connection is e.g. a temperature sensor 35 supplied with energy via the RFID transponder 13 and integrated in the sensor electronics 9 of the pressure or pressure difference sensor 3, 33. Measurement signals of temperature sensor 35 can be read out via the RFID transponder 13. Alternatively, the measuring transducer, preferably a pressure or pressure difference sensor 3, 33, can be provided with an independent temperature sensor 37, which has available a sensor electronics embodied analogously to the sensor electronics 9, via which it is supplied with energy and its measurement signals are read out. In such case, a calibration procedure can also be executed with the method of the invention, in which the temperature dependence of the response of the pressure or pressure difference sensor 3, 33 is recorded in addition to the pressure dependence, and data are derived therefrom, which reflect this response. These data are then likewise stored in the memory 23, e.g. in the form of characterizing parameters and/or characteristic curves.

Figures 3A, 3B, 3C, 3D, 4:
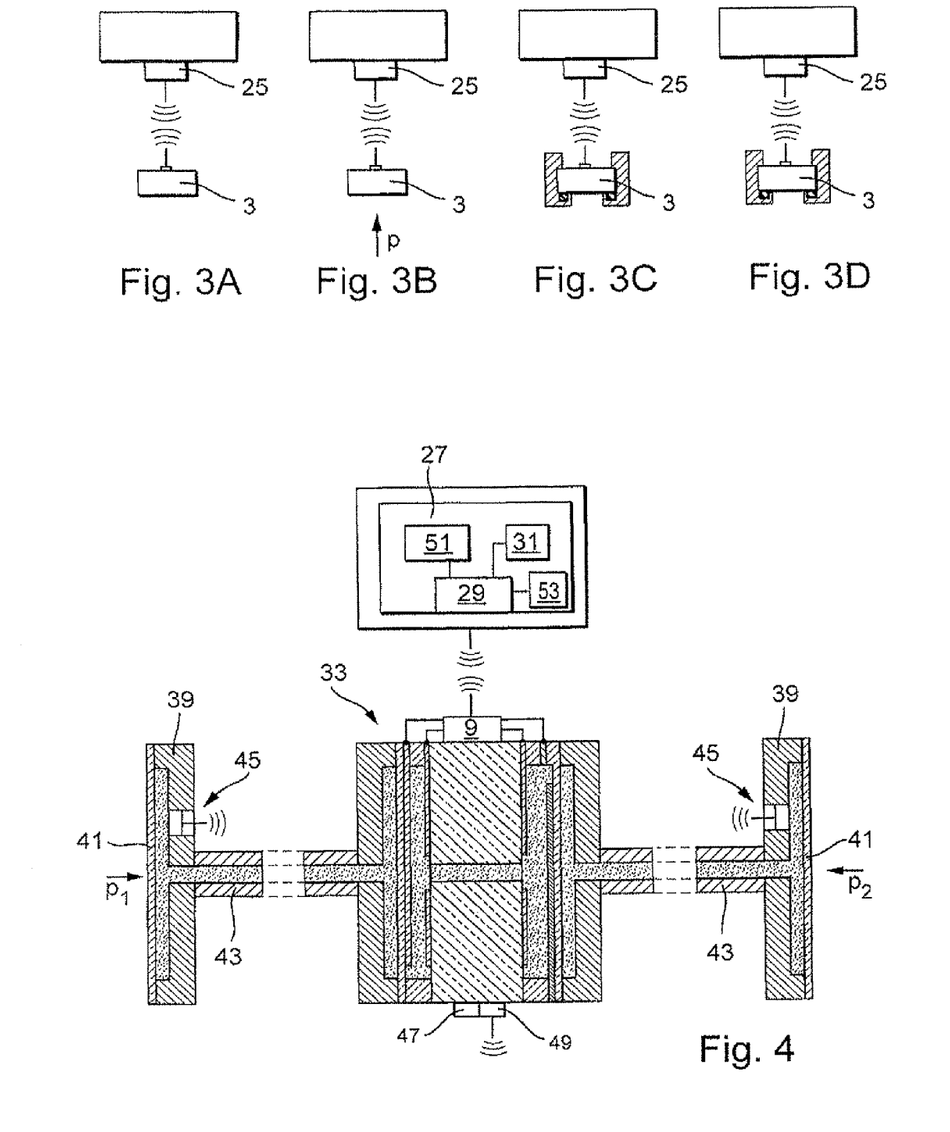
FIG. 4 is a schematic representation of a pressure difference measuring device with a pressure difference transducer equipped with two pressure transfer means.

Forming a further example are pressure or pressure difference transducers, which, as shown in FIG. 4, are equipped with at least one pressure transfer means 39, which serves to transfer the pressure p1, respectively p2, acting on its outer isolating diaphragms 41 to the associated measuring membranes of the pressure difference sensor 33 via capillary lines 43 filled with pressure transmitting medium. A temperature sensor 45 for registering temperature of the pressure transfer means is arranged, in each case, in or on the pressure transfer means 39. The temperature sensors 45 are preferably equipped with sensor electronics formed analogously to the sensor electronics 9. This includes an RFID transponder 13, via which the sensor 45 is supplied with energy, and via which its measurement signals can be read out contactlessly. In such case, as regards the arrangement of the RFID transponder 13, it must naturally be assured that it is not surrounded by metal components of the pressure transfer means 39, which would effect a shielding of the RFID transponder 13. The RFID transponders 13 have a transponder identifier stored in a memory 21, based on which the temperature sensors 45 are contactlessly identifiable at any time during the total manufacturing method and thereafter as well. Corresponding wirelessly queryable, passive temperature sensors are commercially obtainable.

Alternatively, temperature sensors 45 can also be connected to the sensor electronics 9 of the pressure difference sensor 33 via connection lines (not shown) through the capillary lines 43. In such case, energy supply of the temperature sensor 45 and transmission of the temperature measurement signals from the temperature sensors 45 to the sensor electronics 9 of the pressure difference sensor 33 occur via the connection lines. In such a case, however, this energy is still fed from the outside wirelessly via the RFID transponder 13 to the sensor electronics 9 of the pressure difference sensor 33 and the measurement signals of the temperature sensor 45 can be queried externally wirelessly via the RFID transponder 13 of the sensor electronics 9 of the pressure difference sensor 33. This variant is sensible e.g., when the temperature in an outwardly metal shielded, inner space of the pressure transfer means 39 is to be registered. Likewise, this variant is sensible in connection with pressure transfer means 39, which have very long capillary lines 43. Indeed the length of the capillary lines 43 is uncritical as regards the manufacturing process of the invention, since capillary lines 39 can be rolled up or curved during the manufacturing method in such a manner that the range achievable with today's RFID technology is sufficient; however, it is a limiting factor in the case of subsequent use of the measuring transducer in industrial applications. There, the temperature sensors 45 naturally can be only supplied with energy wirelessly and their measurement signals read out wirelessly within the range achievable today.

According to the invention, the wirelessly queryable temperature sensors 45 are naturally also applicable in connection with measuring transducers, which have a classic pressure difference measuring cell connected via an electrical connection line instead of the described passive wirelessly readable pressure difference sensor 33. In this case, the measuring transducer is to be equipped with a memory readable and writable via an associated RFID interface, wherein such memory then performs the functions of the memory 23 of the pressure difference sensor 33 described earlier. Fundamentally, a memory 47, which is equipped with a corresponding RFID interface 49, can be applied, for this, mounted on the measuring transducer at any site. Alternatively, analogously to the example of an embodiment illustrated in FIGS. 1 and 2, a memory can be applied, which is a component of the sensor electronics, especially the RFID transponder, of one of the two temperature sensors 45. The associated RFID interface is provided, in this case, by the RFID transponder of this temperature sensor 45. In the case of two temperature sensors 45, both temperature sensors 45 can naturally be equipped with this memory.

Independently of whether (as memories of the measuring transducer readable and writeable via the associated RFID interface) the memory 23 integrated in the sensor electronics 9 of the pressure difference sensor 33, the one or more memories integrated in one or in both temperature sensors 45, or the separate memory 47 is applied, these memories are naturally utilized completely analogously to the memory 23 described based on the example of an embodiment illustrated in FIGS. 1 and 2 for identification, for storing manufacturing data, for data transfer between individual production stations and for storing data derived in calibration- and/or test procedures.

Here again, the sensors, i.e. the temperature sensors 45 and preferably also the pressure difference sensors 33 and/or the measuring transducer are subjected according to the invention to at least one calibration and/or test procedure, in which at least the temperature sensors 45, preferably naturally also the pressure difference sensors 33, are supplied exclusively with energy via their sensor electronics 9 via their RFID transponder 13, and the measurement signals of the sensors 33, 45 generated during the respective method are read out exclusively via their RFID transponder 13. In such a case, measuring transducer specific and/or sensor specific data are here again derived, which are stored in the memory 23 via the RFID interface.

With the help of the temperature sensors 45, a calibration procedure is preferably executed, with which the response in terms of a transfer characteristic of the pressure transfer means 39 as a function of a pressure p1, respectively p2, acting a thereon and the temperature dependence of their responses are recorded and the data derived therefrom, especially characterizing parameters and/or characteristic curves, are stored in the memory 23. In such case, the temperature dependence is registered with the help of the temperature sensors 45, the measurement signals of which are read out wirelessly. To the extent that the pressure difference sensor 33 is also embodied as a passive sensor, naturally, its measurement signals are also read out contactlessly wherever they are required. In this case, an electrical connection is not required for the test and calibration procedure, since both the pressure difference sensor 33 as well as the two temperature sensors 45 are supplied with energy and their measurement signals are read out contactlessly.

The described pressure difference transducer is applied, analogously to the pressure measuring transducer 1 of FIG. 1, in a measuring device that has a measuring device electronics 27 equipped with an RFID interface 29, via which the measuring device electronics 27 supplies the sensors, i.e. the temperature sensors 45 and preferably the pressure difference sensor 33 with energy, via which the measuring device electronics 27 receives the measurement signals of the respective sensors 45, 33, and via which the measuring device electronics 27 has access to the data stored in the memory 23 or 47 of the measuring transducer.

Among these data are especially data recorded by the temperature sensors 45 and the pressure difference sensor 33 and stored in the memory 23 or 47. Such data reflect the response of the pressure transfer means 39 and its temperature dependence. The measuring device electronics 27 includes a signal processor 51, which, based on a pressure difference measurement signal of the pressure difference sensor 33, the measurement signals of the temperature sensors 45 and the data stored in the memory 23 or 47 of the measuring transducer, produces a pressure difference measurement signal compensated relative to the temperatures present in the pressure transfer means 39. Naturally, the advantages of such measuring devices already named above correspondingly hold here.

Preferably, the measuring device includes a monitoring unit 53, which monitors the measurement signals of the temperature sensors 45 and triggers an error report and/or an alarm in the case of loss of a measurement signal of the temperature sensors 45. In this way, for example, damage to the pressure transfer means 39, which leads to a failure of the temperature sensor 45, is recognized.

The invention claimed is:

1. A method for manufacturing measuring transducers, especially pressure or pressure difference measuring transducers, with:
a memory readable and writable via an associated RFID interface, at least one sensor for registering a physical, measured variable and for transducing such into an electrical variable,
which sensor is equipped with a sensor electronics, said sensor electronics serving to condition the electrical variable into an electrical measurement signal dependent on the measured variable, and which is equipped with an RFID transponder, for supplying the sensor with energy via said RFID transponder, and for reading out the measurement signals wirelessly via said RFID transponder, the method comprising the steps of:
subjecting the measuring transducers and/or their sensors to at least one calibration and/or test procedure;
exclusively supplying the sensors with energy via their RFID transponders;
reading out their measurement signals via their RFID transponders;
deriving transducer specific and/or sensor specific data based on the calibration and/or test procedures; and
storing said transducer specific and/or sensor specific data in the memory via the RFID interface.

2. The method as claimed in claim 1, wherein:
a calibration procedure is executed, in which a response of the sensors and/or the measuring transducers as a function of the physical, measured variable, and/or a temperature dependence of this response, are/is ascertained, and data reflecting this response, especially characterizing parameters or characteristic curves, are derived and stored in the memory.

3. The method as claimed in claim 1, wherein:
the measuring transducer is a pressure or pressure difference transducer, which has at least one pressure transfer means;
at least one sensor arranged in the pressure transfer means is a temperature sensor; and
a calibration procedure is executed, wherein: a response of the pressure transfer means as a function of a pressure acting thereon and the temperature registered by the temperature sensors is ascertained, data, especially characterizing parameters or characteristic curves, which reflect this response, are derived, and these data are stored in the memory via the RFID interface associated with the memory.

4. The method as claimed in claim 1, wherein:
a transponder identifier of each sensor is read out and associated with a serial number; and
the measuring transducer and/or the respective sensor are identified contactlessly during the total subsequent manufacturing method based on the transponder identifier and/or the serial number associated therewith stored in the memory via the RFID interface.

5. The method as claimed in claim 1, wherein:
manufacturing data registered during manufacture, especially the date of manufacture, batch number, data relevant to the quality of the manufacturing process and/or serial number are stored in the memory via the RFID interface associated with the memory.

6. The method as claimed in claim 1, wherein:
the measuring transducer passes in a production line through a plurality of production stations, one after the other, in which, in each case, a portion of the manufacturing process is executed;
the measuring transducer is identified in the production stations via the transponder identifiers of the sensors and/or data stored in the memory, which is read out in the respective production station via the RFID interface associated with the memory, and/or
manufacturing relevant data from a production station (A, B or C) are transmitted to a following production station (B, C or D) by storing data at a production station (A, B or C) via a read write apparatus of such production station (A, B or C) and the RFID interface associated with the memory and in the following production station (B, C or D) are read out from the memory via a read write apparatus of such production station (B, C or D) and the RFID interface associated with the memory.

7. A measuring transducer, especially a pressure or pressure difference transducer, comprising:
at least one sensor for registering a physical, measured variable and for transducing such into an electrical variable, said at least one sensor being equipped with a sensor electronics, which serves to condition the electrical variable into an electrical measurement signal dependent on the measured variable, which sensor is equipped with a sensor electronics, said sensor electronics serving to condition the electrical variable into an electrical measurement signal dependent on the measured variable, and which is equipped with an RFID transponder, for supplying the sensor with energy via said RFID transponder, and for reading out the measurement signals wirelessly via said RFID transponder; and
a memory readable and writable via the associated RFID interface, in which measuring transducer specific and/or sensor specific data derived from a calibration and/or test procedure are stored via the RFID interface; wherein
the measuring transducer is a pressure or pressure difference transducer equipped with at least one pressure transfer means, and
the sensors comprise at least one temperature sensor, which is arranged in the pressure transfer means, and
measuring transducer specific data, which reflect a response of the pressure transfer means as a function of a pressure acting thereon and a temperature dependence of this response, derived during a calibration and/or test procedure are stored in the memory via the RFID interface.

8. The measuring transducer as claimed in claim 7, wherein:
a sensor is a pressure or a pressure difference sensor; and
the memory and the RFID interface associated therewith are components of the sensor electronics of such sensor, especially its RFID transponder.

9. The measuring transducer as claimed in claim 8, wherein:
said sensor electronics has access to data derived during calibration and/or test procedures and stored in the memory, and at least one of these data is used in the subsequent transducings of the physical, measured variable into the electrical measurement signal.

10. The measuring transducer as claimed in claim 7, wherein:
the measuring transducer is a pressure or pressure difference transducer equipped with at least one pressure transfer means; and
the sensors comprise at least one temperature sensor, which is arranged in the pressure transfer means; and
measuring transducer specific data, which reflect a response of the pressure transfer means as a function of a pressure acting thereon and a temperature dependence of this response, derived during a calibration and/or test procedure are stored in the memory via the RFID interface.

11. The measuring device comprising:
a pressure measuring transducer, comprising:
at least one sensor for registering a physical, measured variable and for transducing such into an electrical variable, said at least one sensor being equipped with a sensor electronics, which serves to condition the electrical variable into an electrical measurement signal dependent on the measured variable, and which is equipped with an RFID transponder, via which the sensor is supplied with energy, and via which measurement signals can be read out wirelessly; and
a memory readable and writable via the associated RFID interface, in which measuring transducer specific and/or sensor specific data derived from a calibration and/or test procedure are stored via the RFID interface;
wherein:
the pressure difference transducer is equipped with at least one pressure transfer means, and
the sensors comprise at least one temperature sensor, which is arranged in the pressure transfer means, and
pressure difference transducer specific data, which reflect a response of the pressure transfer means as a function of a pressure acting thereon and a temperature dependence of this response derived during a calibration and/or test procedure are stored in the memory via the RFID interface;
the measuring device further comprising:
a measuring device electronics, which has an RFID interface via which the measuring device electronics supplies the sensors with energy, via which the measuring device electronics receives measurement signals of the sensors, and via which the measuring device electronics has access to data stored in the memory; and
the measuring device electronics has a signal processor, which, based on a pressure difference measurement signal of the pressure difference sensor, measurement signals of the temperature sensors and data stored in the memory, produces a pressure difference measurement signal compensated relative to temperatures reigning in the pressure transfer means.

12. The measuring device as claimed in claim 11, having a pressure difference transducer, wherein:
the measuring transducer is a pressure or pressure difference transducer equipped with at least one pressure transfer means;
the sensors comprise at least one temperature sensor, which is arranged in the pressure transfer means; and
measuring transducer specific data, which reflect a response of the pressure transfer means as a function of a pressure acting thereon and a temperature dependence of this response, derived during a calibration and/or test procedure are stored in the memory via the RFID interface;

which has a pressure difference sensor having at least one pressure transfer means connected thereto, in which, in each case, a temperature sensor is arranged, wherein:

data recorded by the temperature sensors and the pressure difference sensor and reflecting a response of the pressure transfer means as a function of its temperature are stored in the memory, and the measuring device electronics has a signal processor, which, based on a pressure difference measurement signal of the pressure difference sensor, measurement signals of the temperature sensors and data stored in the memory, produces a pressure difference measurement signal compensated relative to temperatures reigning in the pressure transfer means.

13. The measuring device as claimed in claim 11, further comprising:

a monitoring unit, which monitors measurement signals of the temperature sensors and triggers an error report and/or an alarm in the case of loss of a measurement signal of a temperature sensor.

\* \* \* \* \*